(12) United States Patent
Biebl et al.

(10) Patent No.: US 12,030,750 B2
(45) Date of Patent: Jul. 9, 2024

(54) METHOD FOR MOUNTING OR DISMOUNTING COMPONENTS OF A WIND TURBINE AND ROPE WINCH UNIT

(71) Applicant: Wobben Properties GmbH, Aurich (DE)

(72) Inventors: Herbert Biebl, Südbrookmerland (DE); Ewald Freese, Ochtersum (DE); Cord Druivenga, Ihlow (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/903,601

(22) Filed: Sep. 6, 2022

(65) Prior Publication Data

US 2023/0075096 A1 Mar. 9, 2023

(30) Foreign Application Priority Data

Sep. 7, 2021 (EP) .................................... 21195285

(51) Int. Cl.
*B66C 13/08* (2006.01)
*B66C 23/18* (2006.01)
*B66D 1/28* (2006.01)

(52) U.S. Cl.
CPC ............ *B66C 13/08* (2013.01); *B66C 23/185* (2013.01); *B66D 1/28* (2013.01); *B66D 2700/0183* (2013.01)

(58) Field of Classification Search
CPC ..................... B66D 1/7431; B66D 1/28; B66D 2700/0183; B66D 1/04; B66D 1/7489; B66C 23/166; B66C 13/08; B66C 23/185; B66C 23/42; B66C 23/46; B66C 23/48; B66C 23/485; B66C 23/50; B66C 23/36; B66C 23/365
See application file for complete search history.

(56) References Cited

U.S. PATENT DOCUMENTS 3,625,445 A * 12/1971 Hall .......................... B66D 1/20
156/767
7,111,826 B2 9/2006 Cook et al.
(Continued)

FOREIGN PATENT DOCUMENTS

WO WO 2014202691 A1 12/2014
WO WO 2020135907 A1 7/2020

*Primary Examiner* — Michael R Mansen
*Assistant Examiner* — Nathaniel L Adams
(74) *Attorney, Agent, or Firm* — Seed IP Law Group LLP

(57) ABSTRACT

A method for mounting or dismounting components of a wind turbine is provided. The mounting or dismounting is accomplished by fastening at least one retaining rope or guide rope to a component to be mounted by fastening the retaining rope or the guide rope to a rope winch unit and by raising or lowering the component to be mounted or to be dismounted by means of a crane. The component to be mounted or to be dismounted is held or guided by means of the retaining rope or guide rope. The rope winch unit comprises a base, a pivot arm and a retaining unit. The pivot arm is pivot-ably coupled to the base at its first end. A rope winch for receiving the retaining rope or guide rope is provided at its second free end. The retaining unit is pivot-ably coupled to the pivot arm. The base comprises a plurality of latching units for receiving a first end of the retaining unit.

5 Claims, 9 Drawing Sheets

(56) References Cited

U.S. PATENT DOCUMENTS

| | | | |
|---|---|---|---|
| 7,770,870 B1 | 8/2010 | Fly | |
| 9,003,992 B2 | 4/2015 | VanScoyoc | |
| 9,719,632 B2* | 8/2017 | Weidner | B66D 1/00 |
| 9,926,907 B2 | 3/2018 | Hoffmann et al. | |
| 10,071,889 B1* | 9/2018 | Lopez | B66C 23/166 |
| 2011/0053482 A1* | 3/2011 | McKenzie | B66C 23/44 |
| | | | 452/187 |
| 2020/0071138 A1* | 3/2020 | Aitken | B66C 23/68 |
| 2022/0055869 A1* | 2/2022 | Kastrup | B66D 1/7431 |

* cited by examiner

METHOD FOR MOUNTING OR DISMOUNTING COMPONENTS OF A WIND TURBINE AND ROPE WINCH UNIT

BACKGROUND

Technical Field

The present invention relates to a method for mounting or dismounting components of a wind turbine and a rope winch unit.

Description of the Related Art

When mounting or dismounting, for example, on a wind turbine, large components such as rotor blades or an electric generator of the wind turbine must be mounted or dismounted by means of a crane. In this case, typically retaining ropes or guide ropes are used.

WO 2014/202691 A1 discloses a method for mounting a rotor blade by means of a crane and two retaining ropes. Whilst the rotor blade is raised by means of the crane, two retaining ropes are fastened to the rotor blade and serve to hold or guide the rotor blade so that the rotor blade cannot move uncontrollably.

BRIEF SUMMARY

Provided is a method for mounting or dismounting a wind turbine which allows a safe mounting or dismounting.

In one embodiment, provided is a method for mounting or dismounting components of a wind turbine, in particular large components (e.g., rotor blade, generator). The components of the wind turbine are raised or lowered by means of a crane. In order to secure the component at least one retaining rope is coupled on the one hand to the component and on the other hand to a rope winch unit. The rope winch unit can optionally be provided in the rear of the base or on a vehicle. The rope winch unit has a first end in the form of a base or base unit which can be fastened on or in the ground or on a vehicle. The rope winch unit further comprises a second end in the form of a pivot arm. A winch is provided at the free end of the pivot arm by means of which the tension on the retaining rope can be influenced by actuating the winch. A retaining unit is fastened pivotably to the pivot arm. The base unit has a plurality of recesses for receiving a free end of the retaining unit. The angle of the pivot arm can be adjusted by selecting the respective latching unit. Optionally the winch unit has a dynamometer for monitoring the load acting on the rope.

Optionally the pivot arm has a roller unit at its free end comprising at least one roller through which a rope is guided and can be wound on the winch. This is advantageous since the winch can thus be righted when the angle of the retaining rope is too steep. To this end, the angle of the pivot arm is changed. In this case, the free end of the retaining unit is removed from the present position and can be locked in a new position as a result of gravity.

Optionally the pivot arm can have several portions which do not run straight to improve the force behavior. In particular, the pivot arm can comprise a first portion and a second portion wherein the first portion is pivotably coupled to the base unit and the second portion serves to receive the rope winch and optionally the roller unit.

A third portion can be provided between the first and second portions of the pivot arm so that the first and second portions are not arranged in a straight line with respect to one another. On the contrary, an angle between an underside of the first portion and the third portion can have an angle of <180°. Furthermore, an angle between an upper side of the second portion and the third portion can be <180°.

According to one aspect, the base unit can comprise two struts which are each coupled to one another via a cross strut. The struts can comprise the latching units.

According to one aspect, the pivot arm can comprise two struts. A winch is provided in the region of the second portion of the pivot arm.

According to one aspect, the rope winch unit can be installed on a bog mat (this can and may slip in contrast to vehicle or ground nails.

Also provided is a rope winch unit comprising a base unit, a pivot arm and a retaining unit. The pivot arm is pivotably coupled to the base unit at its first end. At its second free end the pivot arm has a rope winch for receiving a retaining rope or guide rope. The retaining unit is pivotably connected to the pivot arm. The base unit has a plurality of latching units for receiving a first end of the retaining unit.

According to one aspect, the pivot arm has a first portion which is pivotably coupled to the base unit, a second portion to which the rope winch is coupled and a third portion between the first and second portions. An angle between the underside of the first and third portions is less than 180° and greater than 90°. An angle between the underside of the second portion and the underside of the central portion is greater than 180°.

According to a further aspect, a dynamometer is provided in the area of the second portion in order to detect a force acting on the retaining rope or guide rope.

Also provided is a method of use of a rope winch unit during mounting or dismounting of components of a wind turbine. The rope winch unit comprises a base unit, a pivot arm and a retaining unit. The pivot arm is pivotably coupled to the base unit at its first end and has a rope winch for receiving the retaining rope at its second free end. The retaining unit is pivotably coupled to the pivot arm. The base unit comprises a plurality of latching units for receiving a first end of the retaining unit. The rope winch receives a first end of a retaining rope or guide rope in order to align the component of a wind turbine to be mounted or to be dismounted during mounting or dismounting.

BRIEF DESCRIPTION OF THE SEVERAL VIEWS OF THE DRAWINGS

Exemplary embodiment and advantages of the invention are explained in detail hereinafter with reference to the drawings.

DETAILED DESCRIPTION

Figure 1:
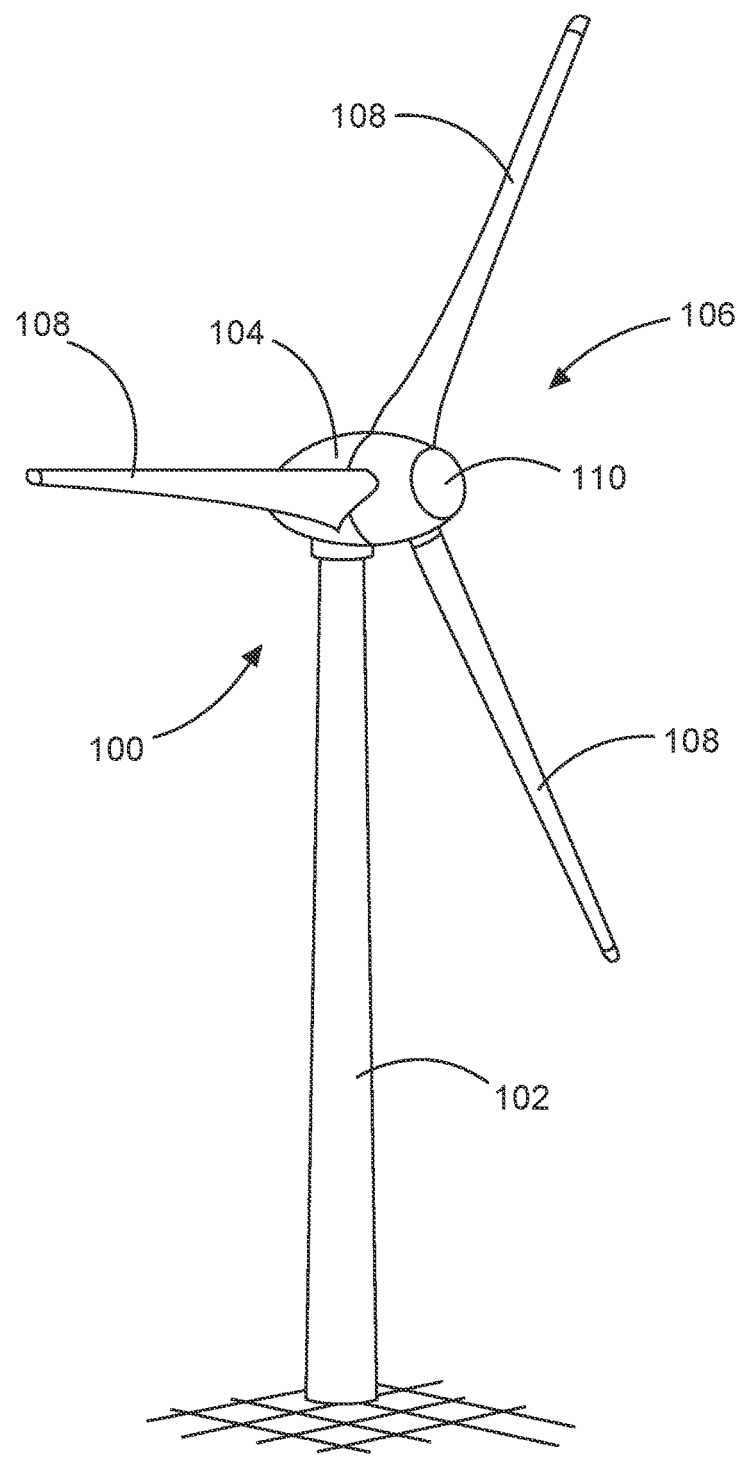
FIG. 1 shows a schematic diagram of a wind turbine

FIG. 1 shows a schematic diagram of a wind turbine according to the invention. The wind turbine 100 comprises a tower 102 and a nacelle 104 on the tower 102. An aerodynamic rotor 106 with three rotor blades 108 and a spinner 110 is provided on the nacelle 104. The aerodynamic rotor 106 is set in rotary motion by the wind during operation of the wind turbine and thus also turns a rotor or armature of a generator which is coupled directly or indirectly to the aerodynamic rotor 106. The electrical generator is arranged in the nacelle 104 and generates electrical energy. The pitch angle of the rotor blades 108 can be changed by pitch motors at the rotor blade roots of the respective rotor blades 108.

Figure 2:
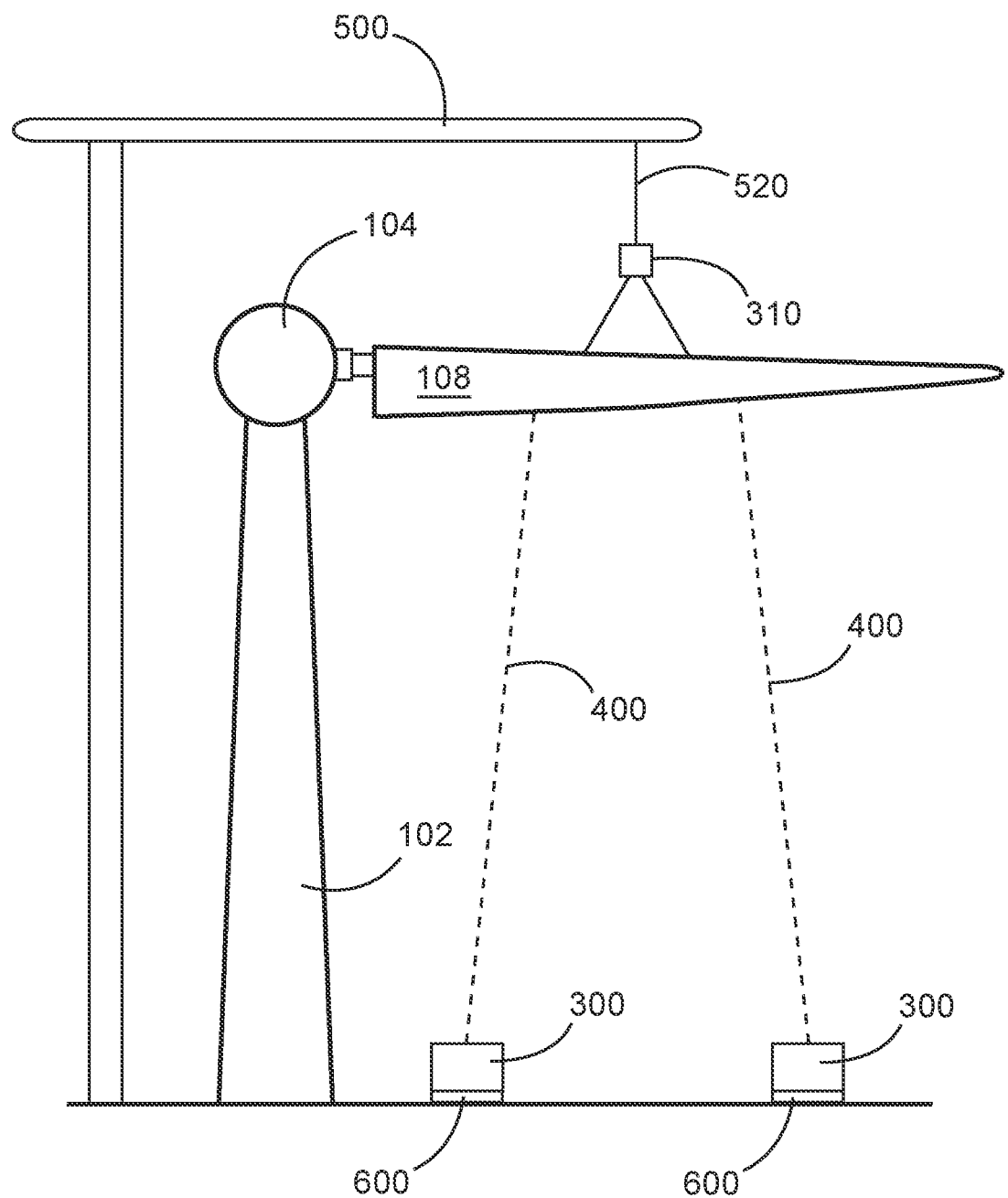
FIG. 2 shows a schematic diagram during mounting of a rotor blade of a wind turbine.
Figure 3:
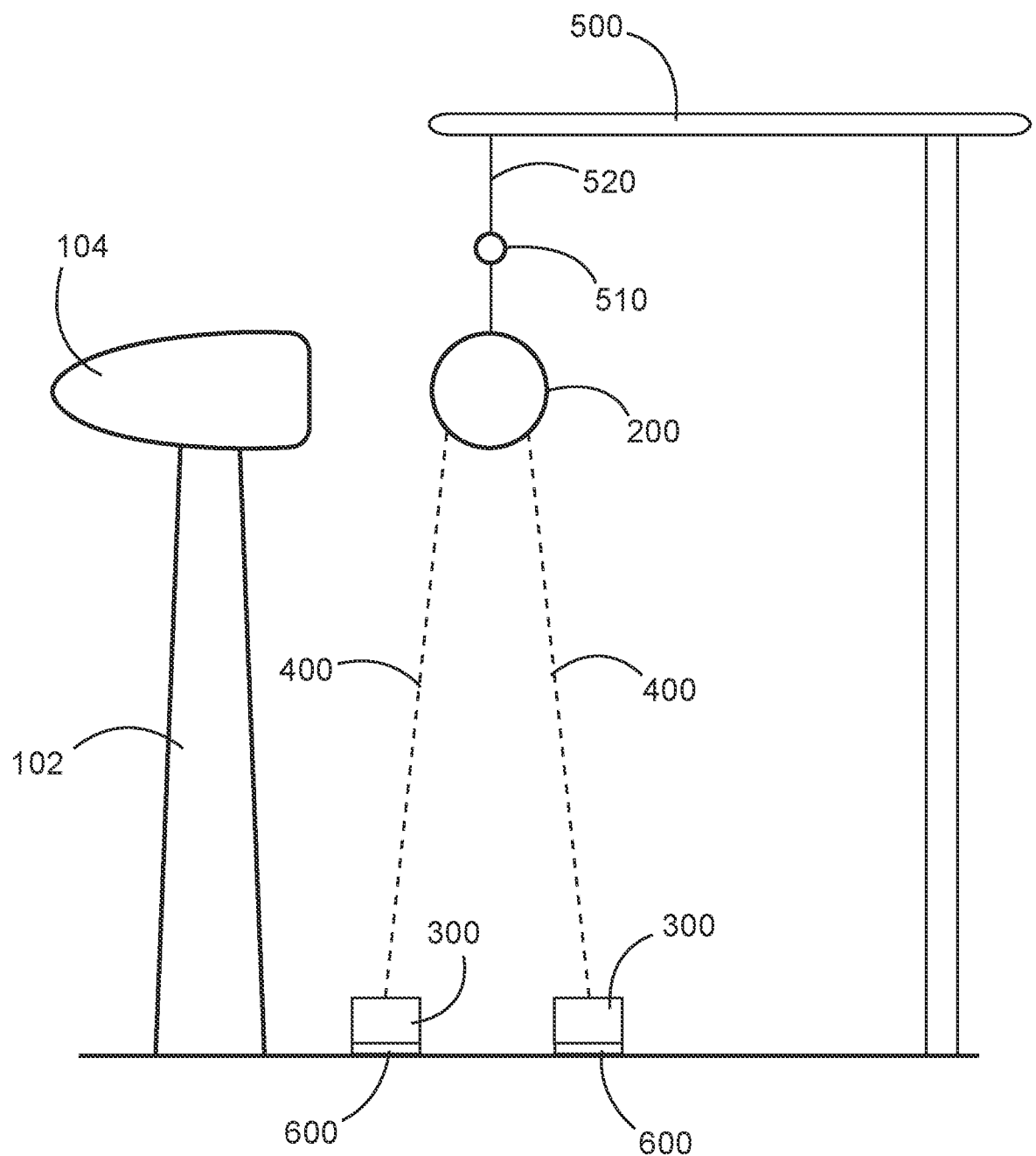
FIG. 3 shows a schematic diagram during mounting of a generator of a wind turbine and FIGS. 4A to 4F each show different diagrams of a rope winch unit according to one exemplary embodiment of the invention.

FIG. 2 shows a schematic diagram during mounting of a rotor blade and FIG. 3 shows a schematic diagram during mounting of a generator of a wind turbine. A rotor blade 108 can be raised by means of a crane 500, a crane rope 520 and a crane hook 510. In order to improve the stability of the position of the rotor blade 108, two retaining ropes 400 are fastened in or on the rotor blade. The retaining ropes 400 are each coupled to a rope winch unit 300. By means of the rope winch unit 300 and the retaining ropes 400, the rotor blade 108 can be held in the desired position or alignment. When raising the rotor blade 108 by means of the crane 500, the rope winch units 300 must match the length of the retaining ropes 400 accordingly. The rope winch units 300 can be placed on a base or a foundation unit 600.

In FIG. 3 instead of a rotor blade, a generator 200 is raised by means of the crane 500. Here also two retaining ropes 400 are coupled to the generator 200. The other ends of the retaining ropes 400 are each coupled to a rope winch unit 300. The rope winch units 300 can optionally be placed on a foundation 600.

The foundation 600 can be configured, for example, in the form of concrete weights or bog mats.

Figure 4A:
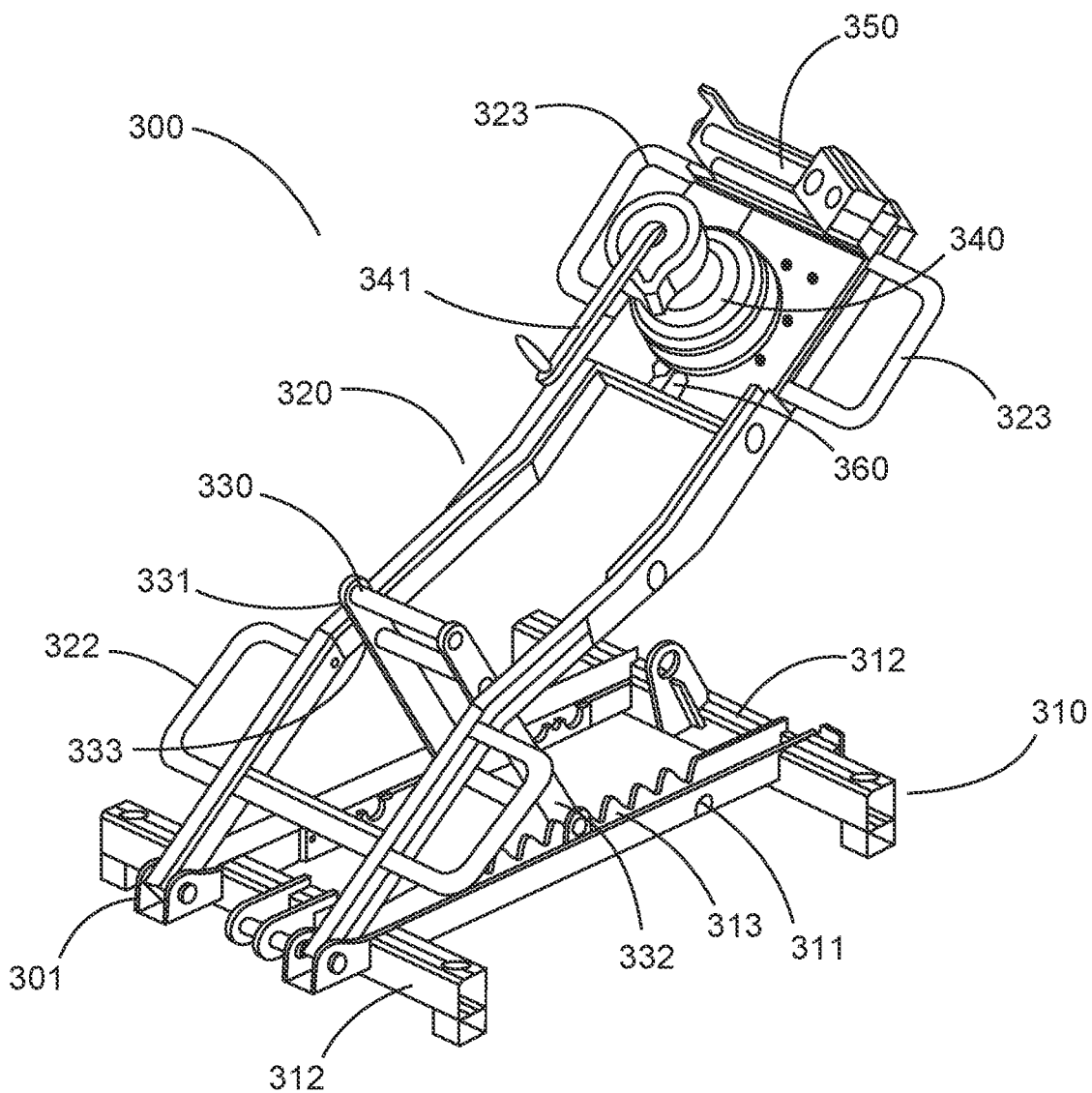
Figure 4B:
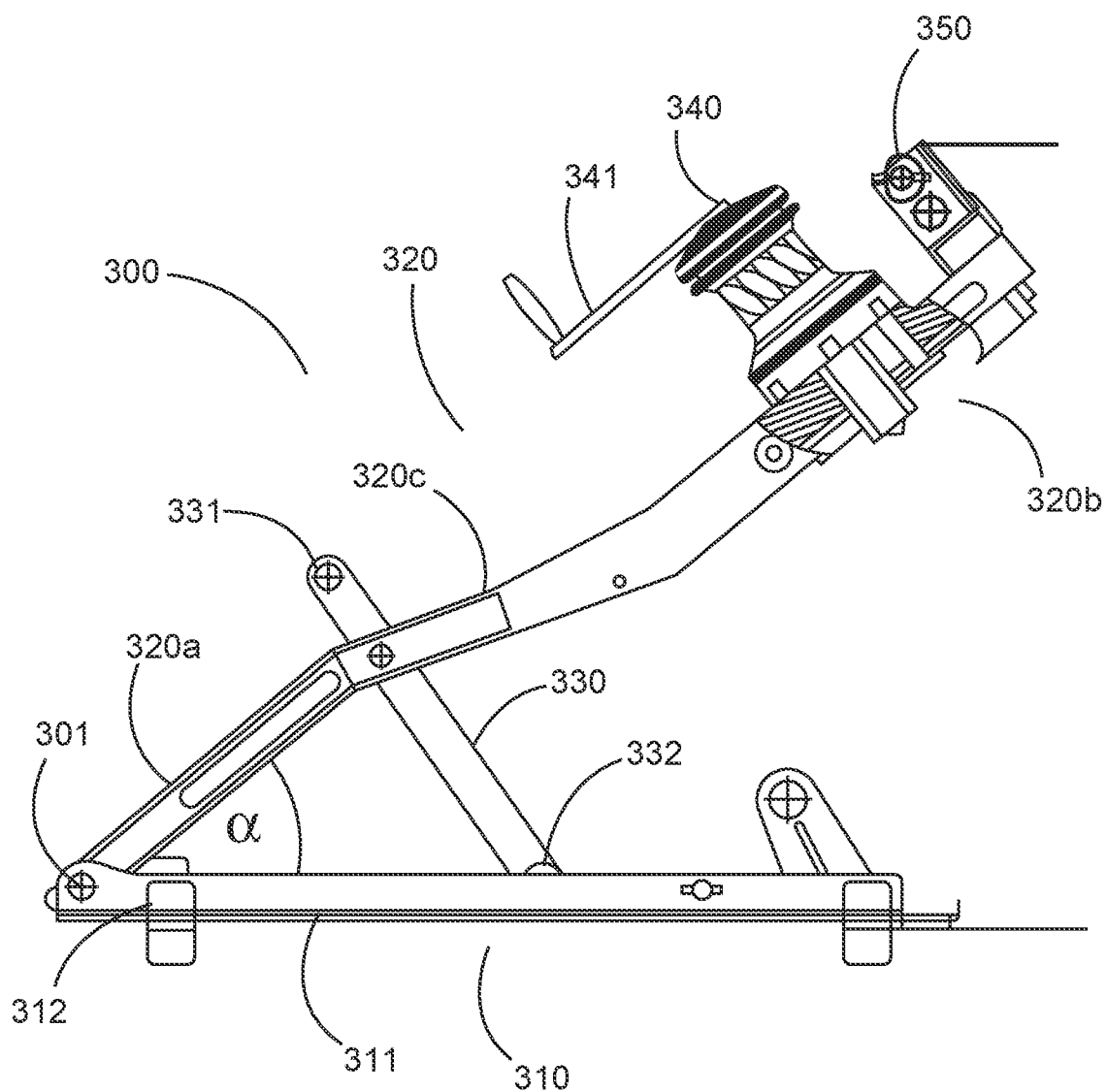
Figure 4C:
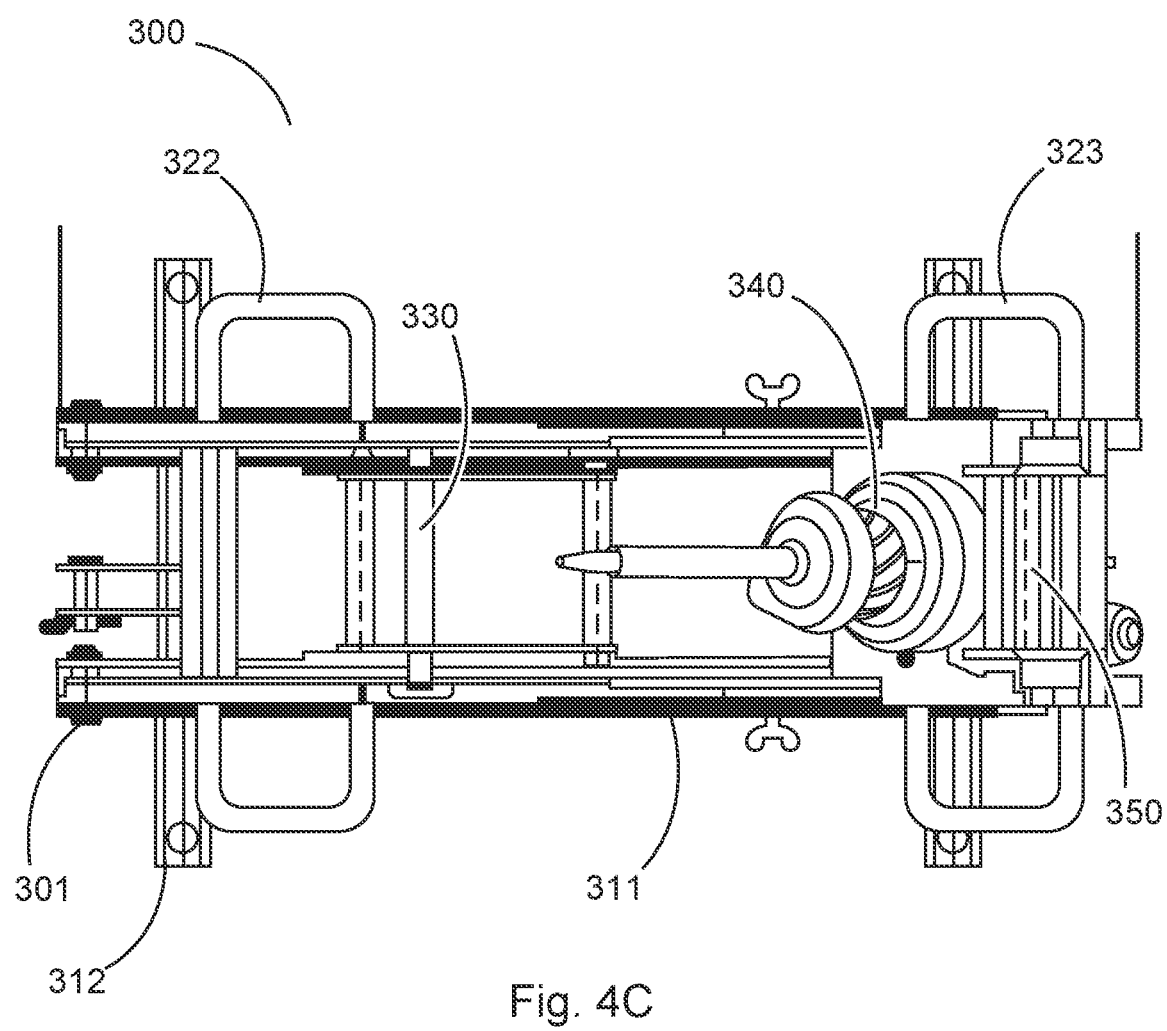
Figure 4D:
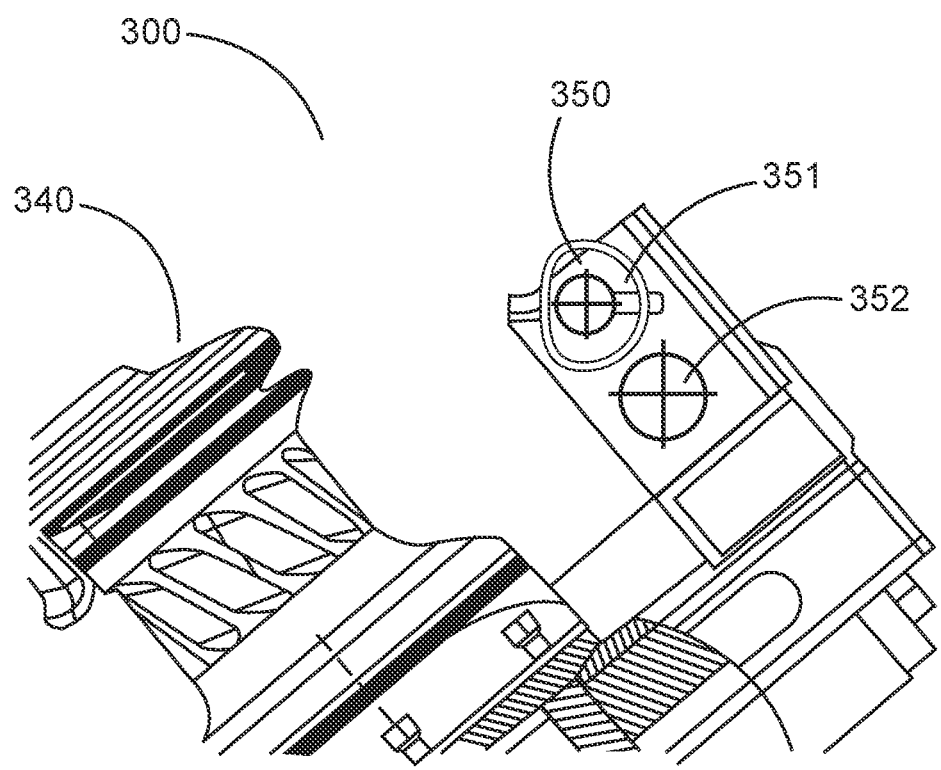
Figure 4E:
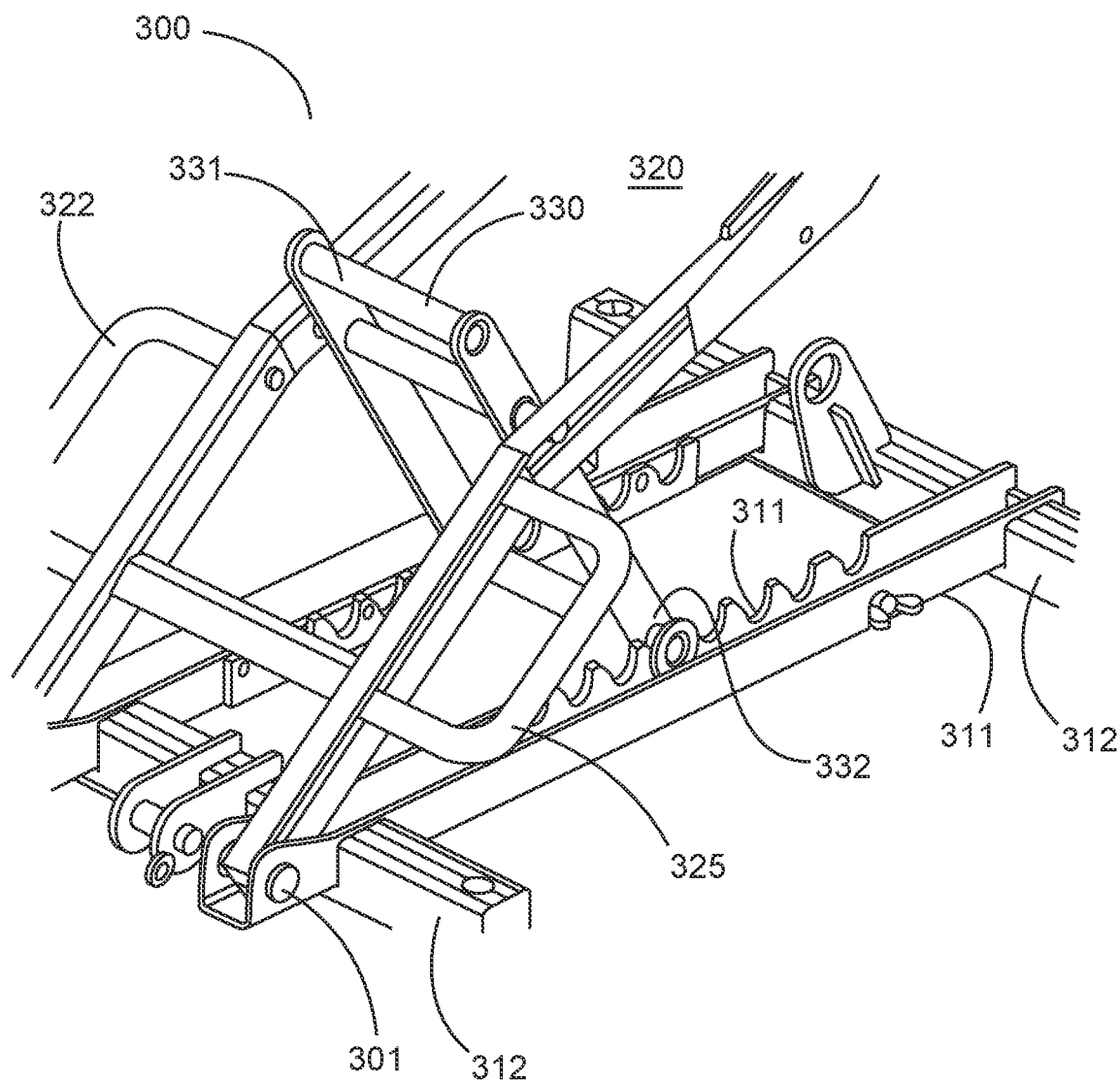
Figure 4F:
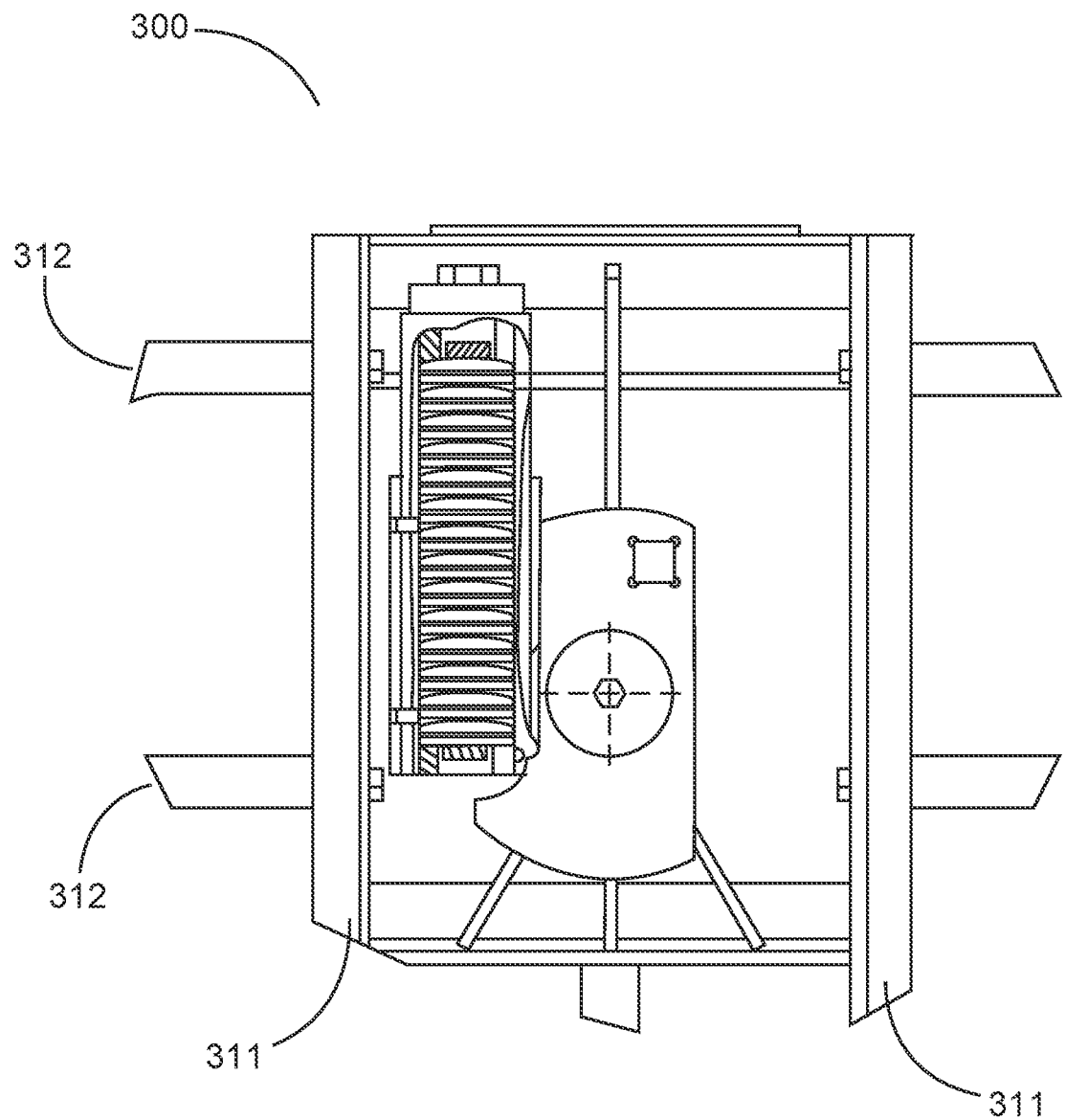

FIGS. 4A to 4F show various views of a rope winch unit according to one aspect of the present invention. FIG. 4A shows a perspective view of the rope winch unit. FIG. 4B shows a side view, FIG. 4C shows a plan view, FIG. 4D shows a detailed view of the winch and the roller unit, FIG. 4E shows a detailed view of the retaining unit and the latching units and FIG. 4F shows an underside of the rope winch unit. The rope winch unit 300 comprises a base or base unit 310 and a pivot arm 320. The pivot arm 320 is pivotably coupled to the base unit 310 via a pivot axis 301.

The base unit 310 is used to place the rope winch unit 300 on a base or foundation 600. The base unit 310 can then be detachably fastened in or on the foundation 600. A retaining unit 330 is pivotably fastened to the pivot arm 310. The retaining unit 330 has a first and second end 331, 332.

The base unit 310 can comprise two struts 311 and two cross-struts 312 which are each connected to one another. Latching units 313 can be provided in the area of the struts 311. The second end 333 [332] can then be engaged in the respective latching units 313. The retaining unit can be pivotably provided on the pivot arm 320 via a pivot axis 333. The pivot arm 320 can comprise first handles 322 at a first end and second handles 323 at a second end. A rope winch 340 with a crank 341 is provided at the second end of the pivot arm (the free end of the pivot arm). Furthermore, a roller unit 355 and a (mechanical) dynamometer 360 can be provided at the second end. A retaining rope 400 can then be guided by the roller unit 350 and wound by means of the winch 340.

The loading on the retaining rope 400 can be checked by means of the dynamometer. If the loading is too great, the operator can slacken the retaining rope. The rope is placed around the winch, 2-3 times for example. The rope can be slackened by slackening or loosening the rope. The rope can be hauled tight by the crank.

An angle α between the base unit 310 and the pivot arm 320 is dependent on the position of the retaining unit 330.

According to one aspect, the pivot arm 320 comprises a first portion 320a at the first end, a second portion 320b at the second end (the free end) and a third portion 320c between the first and second portions. The first portion 320a is coupled to a pivot axis 310.

As shown in FIG. 4D, both the winch unit 340 and also the roller unit 350 are provided at the free end (second portion 320). A retaining rope is introduced through the first and second rollers 351, 352 and wound by means of the winch 340.

According to one aspect, the first and second portions 320a, 320b of the pivot arm 320 do not lie on a straight line. On the contrary, a central portion 320c is provided between the first portion 320a and the second portion 320b, which is provided at an angle to the first and second portions. The angle between an underside of the first portion 320a and an underside of the central portion 320c is greater than 90° and less than 180°. An angle between an underside of the second portion 320b and an underside of the portion 320c is greater than 180°. An improved force distribution is possible with such a configuration of the pivot arm.

When mounting a rotor blade 108 or a generator 200 as shown in FIGS. 2 and 3, one end of the retaining rope 400 is fastened to the component to be mounted and another end 400 is guided through the two rollers 351, 352 of the roller unit 350 and connected to the winch 340. The winch unit 300 can be fastened on a foundation 600 as shown in FIGS. 2 and 3. When raising the rotor blade 108 or the generator 200, the angle of the retaining rope 400 to the ground and therefore also the angle α between the base unit 310 and the pivot arm 320 varies. Since the pivot arm 320 can pivot freely upwards, the pivot arm 320 can follow the changed angle α. By means of the retaining unit 330 whose second end 332 is fastened in one of the latching elements 313, it is ensured that the pivot arm 320 does not drop downwards even when slackening the tension of the retaining rope. Since the latching elements 313 are open towards the top, the pivot arm 320 and the retaining unit 330 can perform a movement towards a greater angle without any influencing by an operator.

According to one aspect, a further rope drum can be provided for receiving the excess rope.

REFERENCE LIST

100 Wind turbine
102 Tower
104 Nacelle
106 Rotor
108 Rotor blades
110 Spinner
200 Generator
300 Rope winch unit
301 Pivot axis
310 Base unit
311 Struts
312 Cross struts
313 Latching units
320 Pivot arm
320a First portion
320b Second portion
320c Third portion
322 First handle
323 Second handle
330 Retaining unit
331 First end
332 Second end 333 Pivot axis
340 Rope winch
341 Crank
350 Roller unit
351 First roller
352 Second roller
355 Roller unit
360 Dynamometer
400 Retaining rope
500 Crane
510 Crane hook
520 Crane rope
600 Base unit The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rope winch unit, comprising:
a base,
a pivot arm, and
a retaining unit,
wherein a first end of the pivot arm is pivotably coupled to the base,
wherein a second end the pivot arm is free and comprises a rope winch for receiving a retaining rope or guide rope,
wherein the retaining unit is pivotably coupled to the pivot arm,
wherein the base comprises a plurality of latching units for receiving a first end of the retaining unit,
wherein the pivot arm comprises a first portion that is pivotably coupled to the base, a second portion to which the rope winch is coupled, and a third portion between the first and second portions,
wherein an angle between an underside of the first and third portions is less than 180° and greater than 90°, and
wherein an angle between an underside of the second portion and the underside of the third portion is greater than 180°.

2. The rope winch unit according to claim 1, further comprising a mechanical dynamometer for detecting a force acting on the retaining rope or guide rope in a region of the second portion.

3. A method for mounting or dismounting a component of a wind turbine, the method comprising:
fastening a retaining rope or guide rope on the component to be mounted or dismounted;
fastening the retaining rope or the guide rope to a rope winch unit; and
raising or lowering the component to be mounted or to be dismounted by a crane, wherein the component to be mounted or to be dismounted is held or guided by the retaining rope or the guide rope,
wherein the rope winch unit comprises a base unit, a pivot arm and a retaining unit, wherein the pivot arm is coupled pivotably to the base unit and has a free end, and at the free end has a rope winch for receiving the retaining rope or the guide rope,
wherein the retaining unit is coupled pivotably to the pivot arm,
wherein the base unit comprises a plurality of latching units for receiving a first end of the retaining unit,
wherein the pivot arm comprises a first portion that is pivotably coupled to the base unit, a second portion to which the rope winch is coupled, and a third portion between the first and second portions,
wherein an angle between an underside of the first and third portions is less than 180° and greater than 90°, and
wherein an angle between an underside of the second portion and the underside of the third portion is greater than 180°.

4. The method according to claim 3 further comprising using a mechanical dynamometer to detect a force acting on the retaining rope or guide rope in a region of the second portion.

5. A method of using a rope winch unit for mounting or dismounting a component of a wind turbine,
wherein the rope winch unit comprises a base, a pivot arm, and a retaining unit,
wherein the pivot arm has a first end pivotably coupled to the base and a second end, a rope winch at the second end and configured for receiving the retaining rope or the guide rope,
wherein the retaining unit is pivotably coupled to the pivot arm,
wherein the pivot arm comprises a first portion that is pivotably coupled to the base, a second portion to which the rope winch unit is coupled, and a third portion between the first and second portions,
wherein an angle between an underside of the first and third portions is less than 180° and greater than 90°, and
wherein an angle between an underside of the second portion and the underside of the third portion is greater than 180°, and
wherein the base comprises a plurality of latching units for receiving a first end of the retaining unit, the method of using comprising:
fastening a first end of a retaining or guide rope to the component to be mounted or dismounted;
fastening a second end of the retaining or guide rope to the rope winch; and
raising or lowering the component to be mounted or to be dismounted by a crane, wherein the component to be mounted or to be dismounted is held or guided by the retaining or guide rope.

* * * * *